US008925398B2

(12) United States Patent
Kozawa et al.

(10) Patent No.: US 8,925,398 B2
(45) Date of Patent: Jan. 6, 2015

(54) METHOD FOR CLASSIFYING POWDER

(75) Inventors: Kazumi Kozawa, Fujimino (JP); Satoshi Akiyama, Fujimino (JP); Kosuke Ando, Fujimino (JP)

(73) Assignee: Nisshin Seifun Group Inc., Tokyo (JP)

( * ) Notice: Subject to any disclaimer, the term of this patent is extended or adjusted under 35 U.S.C. 154(b) by 46 days.

(21) Appl. No.: 13/123,770

(22) PCT Filed: Aug. 26, 2009

(86) PCT No.: PCT/JP2009/064869
§ 371 (c)(1), (2), (4) Date: Apr. 22, 2011

(87) PCT Pub. No.: WO2010/047175
PCT Pub. Date: Apr. 29, 2010

(65) Prior Publication Data

US 2011/0219854 A1 Sep. 15, 2011

(30) Foreign Application Priority Data

Oct. 24, 2008 (JP) ................................ 2008-273775
Mar. 18, 2009 (JP) ................................ 2009-066312

(51) Int. Cl.

*G01N 15/02* (2006.01)
*B07B 7/086* (2006.01)
*B07B 4/00* (2006.01)
*B07B 11/02* (2006.01)
*B22F 1/00* (2006.01)

(52) U.S. Cl.

CPC . *B07B 7/086* (2013.01); *B07B 4/00* (2013.01); *B07B 11/02* (2013.01); *B22F 1/0062* (2013.01)
USPC ...................... 73/865.5; 73/28.04; 73/863.22

(58) Field of Classification Search

USPC ........................ 73/866, 28.04, 863.22, 865.5
See application file for complete search history.

(56) References Cited

U.S. PATENT DOCUMENTS

2002/0197461 A1 12/2002 Takaya et al.
2006/0219056 A1* 10/2006 Larink ........................... 75/338
2009/0032443 A1 2/2009 Taketomi et al.

FOREIGN PATENT DOCUMENTS

CN 1398791 A 2/2003
CN 1398791 A 2/2003
JP A-57-144045 9/1982
JP A-60-260426 12/1985
JP A-61-222562 10/1986
JP A-64-85149 3/1989

(Continued)

OTHER PUBLICATIONS

International Preliminary Report on Patentability issued in International Application No. PCT/JP2009/064869 on May 17, 2011 (with translation).

(Continued)

*Primary Examiner* — Hezron E Williams
*Assistant Examiner* — Paul West
(74) *Attorney, Agent, or Firm* — Oliff PLC

(57) ABSTRACT

A method for classifying a powder using a fluid classifier, which comprises a mixing step of mixing a powder and an assistant agent composed of an alcohol, an input step of inputting the powder mixed in the mixing step into the fluid classifier, a heating step of heating a gas, a supply step of supplying the gas heated in the heating step into the fluid classifier, and a classification step of classifying the powder according to particle diameters in the fluid classifier.

8 Claims, 5 Drawing Sheets

(56) References Cited

FOREIGN PATENT DOCUMENTS

| | | | |
|---|---|---|---|
| JP | A-1-180285 | | 7/1989 |
| JP | A-03-170323 | | 7/1991 |
| JP | U-5-39687 | | 5/1993 |
| JP | A-6-126252 | | 5/1994 |
| JP | A-10-309530 | | 11/1998 |
| JP | A-2000-157933 | | 6/2000 |
| JP | A-2006-127872 | | 5/2006 |
| JP | A-2007-268327 | | 10/2007 |
| JP | A-2009-34560 | | 2/2009 |
| TW | I 291936 | B | 1/2008 |

OTHER PUBLICATIONS

International Search Report issued in International Application No. PCT/JP2009/064869 on Dec. 8, 2009 (with translation).

Feb. 29, 2012 Extended European Search Report issued in European Patent Application No. EP 09 82 1875.3.

Oct. 22, 2012 Office Action issued in Chinese Patent Application No. 200980142347.7 (with translation).

Jan. 15, 2013 Office Action issued in Japanese Application No. 2010-534747 (with translation).

Sep. 11, 2013 Chinese Office Action issued in Chinese Patent Application No. 200980142347.7 (with translation).

Taiwan Office Action issued in Application No. 098130057 mailed Nov. 27, 2013 (with English Translation).

Apr. 30, 2014 Decision of Rejection issued in Taiwanese Patent Application No. 098130057 (with English Translation).

Jul. 23, 2014 Office Action issued in European Patent Application No. 09821875.3.

Apr. 24, 2013 Office Action issued in Chinese Patent Application No. 200980142347.7 (with translation).

* cited by examiner

METHOD FOR CLASSIFYING POWDER

TECHNICAL FIELD

The present invention relates to a method for classifying powder in which the powder having particle size distribution is classified effectively according to a desired classification point (particle diameter).

BACKGROUND ART

A method for classifying is known in which an auxiliary agent composed of a fluid such as an alcohol is added beforehand when classifying a powder, such as glassy blast furnace slag, into fine powder and rough powder (for example, see Patent Literature 1). In this method for classifying, the formation of aggregated particles with a large particle diameter due to adsorption and clumping together of particles is prevented by electrically neutralizing the polarity of the powder particles through the addition of an auxiliary agent containing polar molecules to the powder, thereby preventing a decline in the efficiency of classification.

CITATION LIST

Patent Literature

Patent Literature 1: Japanese Unexamined Patent Application Publication No. S64-85149

SUMMARY OF INVENTION

Technical Problem

At present, for example, the ceramic used as a dielectric in ceramic multilayer capacitors is manufactured by sintering finely powdered barium titanate ($BaTiO3$) having extremely small particles with an average particle diameter of 0.7 μm. To obtain a high-quality ceramic, not just extremely small average particle diameter but an extremely narrow width of particle size distribution, that is, a relatively homogenous fine powder, is required. Such a fine powder can be obtained by classifying the source powder through centrifugation, for example, but according to the conventional methods for classifying, the source powder adheres to each part inside the classifier thereby blocking the input port of the source and the exhaust port of the high-pressure gas causing deterioration of the classification performance and making long-term operation difficult.

An object of the present invention is to provide a method for classifying powder that can perform effective classification without causing the powder to adhere inside the classifier even when classifying a powder with a particle diameter of less than 1 μm.

Solution to Problem

A method for classifying powder of the present invention is a method for classifying powder using a fluid classifier, and includes: a mixing step of mixing a powder with an auxiliary agent made of an alcohol; a feeding step of feeding the powder mixed at the mixing step into the fluid classifier; a heating step of heating a gas; a supplying step of supplying the gas heated at the heating step to the fluid classifier; and a classifying step of classifying the powder in the fluid classifier based on particle diameter.

Advantageous Effects of Invention

According to the method for classifying powder in the present invention, a powder mixed with an auxiliary agent is fed into a fluid classifier and heated gas is also supplied inside the fluid classifier, and therefore, an effective classification can be performed without causing the powder to adhere inside the fluid classifier even when classifying a powder with a particle diameter of less than 1 μm.

DESCRIPTION OF EMBODIMENTS

Figure 1:
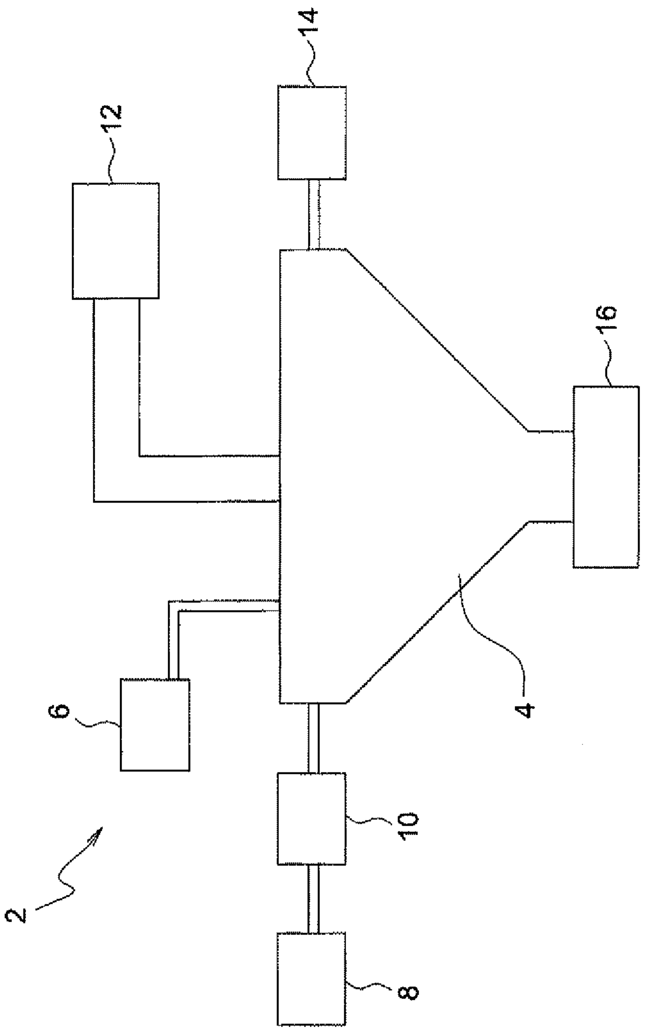
FIG. 1 A schematic configuration diagram showing the configuration of a classification apparatus according to a first embodiment.

Hereinafter, a method for classifying powder according to a first embodiment of the present invention is described with reference to drawings. FIG. 1 is a schematic configuration diagram showing the configuration of a fluid classifier used in the method for classifying powder according to the present embodiment.

As shown in FIG. 1, a classification apparatus 2 includes: a classifier (fluid classifier) 4 for classifying a powder fed as raw material by a spinning air current generated internally; a feeder 6 for feeding the powder into the classifier 4; a blower 8 for supplying high-pressure gas to the classifier 4; and a first heater 10 for heating the supplied high-pressure gas up to a predetermined temperature. Further, the classification apparatus 2 also includes: a suction blower 12 for suctioning and collecting the fine powder separated up to a desired classification point or lower, together with the gas inside the classifier 4; a second heater 14 for heating an atmospheric air (normal-pressure gas) that is suctioned by a negative pressure generated inside the classifier 4; and a collecting vessel 16 for collecting a centrifuged rough powder with a large particle diameter.

The classifier 4 having a generally conical shape is provided such that the cone point is facing towards the lower side, and a centrifuge chamber 20 (see FIG. 2), whose details will be described later, is formed on the upper part inside the classifier 4. Inside this centrifuge chamber 20, the powder that is to be classified is fed from the feeder 6, together with the atmospheric air, which is the normal-pressure gas present outside the classifier 4, and the high-pressure gas from the blower 8.

The feeder 6 has an internal screw that is not shown in the figure, and by rotating this screw, the powder that is stored inside can be delivered quantitatively. The delivered powder is fed into the classifier 4 from an input port 26 (see FIG. 2) provided on the upper surface of the classifier 4. It is noted that the powder stored inside the feeder 6 is mixed beforehand with an auxiliary agent, whose details will be described later.

The blower 8 generates high-pressure gas by compressing the atmospheric air and supplies the generated high-pressure gas to the classifier 4 via the first heater 10. The first heater 10 has an internal pipe through which the high-pressure gas passes, and inside this pipe, heating means such as filament or aerofin is provided. Along with heating the high-pressure gas that passes through the pipe up to a predetermined temperature, this heating means removes the moisture present inside the high-pressure gas. It is noted that between the blower 8 and the classifier 4, another water-removing means for removing the moisture content of the high-pressure gas may be provided separately, and a filter for removing dust may be installed as appropriate.

The suction blower 12 collects the fine powder separated by the classifier 4 by suctioning the fine powder from the inlet 32 (see FIG. 2) provided at the center of the upper surface of the classifier 4, together with the gas present inside the classifier 4. It is noted that a filter, such as a bag filter, may also be installed as appropriate between the inlet 32 and the suction blower 12. Here, when the suction blower 12 suctions the gas, a negative pressure is generated inside the classifier 4, and therefore, the atmospheric air, which is the normal-pressure gas present outside the classifier 4, is suctioned inside the classifier 4. As a result of the normal-pressure gas being suctioned in this way, a spinning air current that spins at a high speed is formed inside the centrifuge chamber 20 of the classifier 4. It is noted that because the classification apparatus 2 according to the present embodiment is equipped with the second heater 14 for heating the normal-pressure gas that is suctioned, the temperature of the spinning air current inside the centrifuge chamber 20 can be heated up to the predetermined temperature. Similarly to the first heater 10, the second heater 14 has an internal pipe through which the normal-pressure gas passes, and heating means such as filament or aerofin is provided inside this pipe.

The collecting vessel 16 is provided at a lowermost part of the classifier 4, and collects the rough powder that moves down along the inclination of the conical-shaped part of the classifier 4 after the execution of centrifugation in the centrifuge chamber 20.

Figure 2:
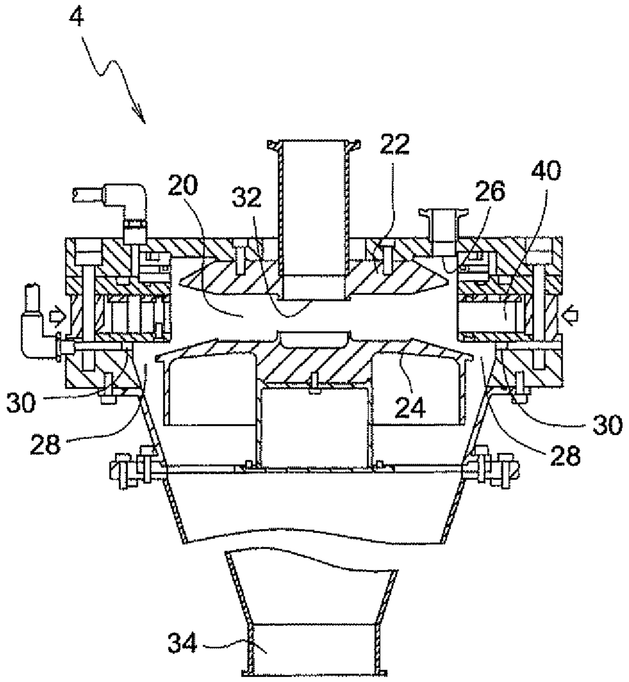
FIG. 2 A vertical cross-sectional view showing an internal configuration of the classifier according to the first embodiment.
Figure 3:
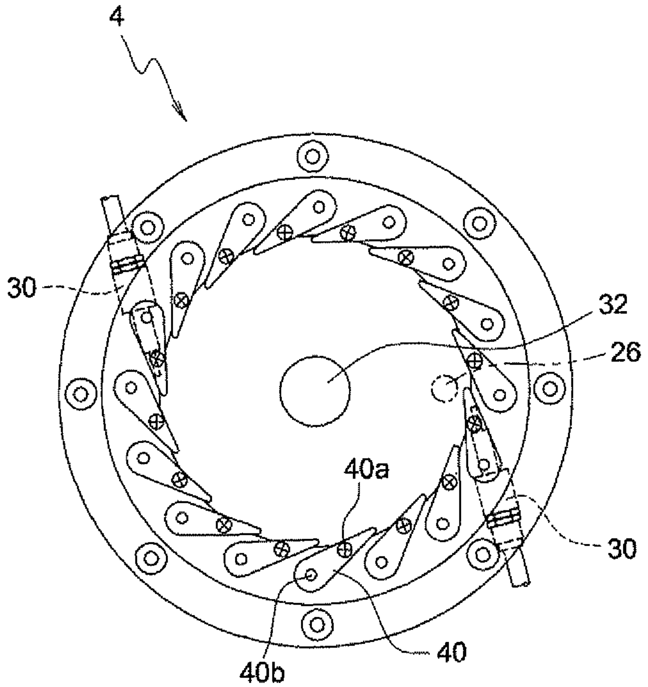
FIG. 3 A horizontal cross-sectional view showing the internal configuration of the classifier according to the first embodiment.

Next, the classifier 4 according to the present embodiment will be described with reference to FIG. 2 and FIG. 3. It is noted that FIG. 2 is a vertical cross-sectional view along a surface that includes the central axis of the classifier 4, and FIG. 3 is a horizontal cross-sectional view at a position of the centrifuge chamber 20 according to the plane surface perpendicular to the central axis. It is noted that, to illustrate the relative positional relationship with respect to other components (particularly, an exhaust nozzle 30 and a guide vane 40 described later), the input port 26 and the exhaust nozzle 30, which are, in reality, not shown in FIG. 3, are indicated by an imaginary line and a dotted line, respectively. Further, only two exhaust nozzles 30 are shown in the figure for explanation.

As shown in FIG. 2, an upper disc-like member 22 having a flat disc shape and a lower disc-like member 24 having a hollow disc shape are arranged at a predetermined interval on the upper part inside the classifier 4, and a circular cylindrical-shaped centrifuge chamber 20 is formed between both of the disc-like members. On the upper side of this centrifuge chamber 20, the input port 26 through which the powder fed from the above-mentioned feeder 6 passes is formed. Further, as shown in FIG. 3, a plurality of guide vanes 40 are arranged at an equal interval on the outer circumference of the centrifuge chamber 20, and on the lower side of the centrifuge chamber 20, a re-classification zone 28 is formed that again ejects the powder that has dropped from the centrifuge chamber 20 after the powder has been centrifuged along the external wall of the lower disc-like member 24 back into the centrifuge chamber 20.

In the vicinity of the upper end of the external wall of the re-classification zone 28, the exhaust nozzle 30 for ejecting out the high-pressure gas supplied from the above-mentioned blower 8 is arranged such that the direction of ejection is almost the same as the tangential direction of the external wall. Along with dispersing the powder fed from the input port 26 by ejecting out high-pressure gas, this exhaust nozzle 30 supplementarily supplies the gas to the centrifuge chamber 20. Further, the exhaust nozzle 30 ejects the fine powder present inside the re-classification zone 28 back into the centrifuge chamber 20. It is noted that in the present embodiment, six exhaust nozzles 30 are arranged on the external wall of the re-classification zone 28, but this is only an example, and it is possible to freely determine the arrangement location and the number of the exhaust nozzles 30.

In the center of the upper part of the centrifuge chamber 20, there is provided an inlet 32 for suctioning and collecting the fine powder separated from the rough powder through centrifugation. It is noted that the centrifuged rough powder moves down along the inclination of the conical-shaped part of the classifier 4 from the re-classification zone 28, is ejected out from the exhaust 34 provided at a lowermost part of the classifier 4, and is then stored inside the above-mentioned collecting vessel 16.

As shown in FIG. 3, in the outer circumference of the centrifuge chamber 20, guide vanes 40 that form a spinning air current inside the centrifuge chamber 20 and can also adjust the spinning speed of the spinning air current are arranged. It is noted that in the present embodiment, as an example, 16 guide vanes 40 are arranged. These guide vanes 40 are configured to be pivotally supported by the swing axis 40*a* so as to swing between the upper disc-like member 22 and the lower disc-like member 24, and at the same time, to be locked on to a swing board (swinging means) (not shown in the figure) through pins 40*b*, and by swinging this swing board, all the guide vanes 40 can be simultaneously made to swing at a predetermined angle. In this way, by making the guide vanes 40 swing at the predetermined angle and by adjusting the interval of each guide vane 40, the flow speed of the normal-pressure gas that passes through the intervals in the direction of the hollow arrow shown in FIG. 2 can be changed, and consequently, the flow speed of the spinning air current inside the centrifuge chamber 20 can be changed. Thus, by changing the flow speed of the spinning air current, the classification performance (specifically, the classification point) of the classifier 4 according to the present embodiment can be changed. It is noted that as described above, the normal-pressure gas that passes through each interval of the guide vanes 40 is the normal-pressure gas heated beforehand up to the predetermined temperature by the second heater 14.

Figure 4:
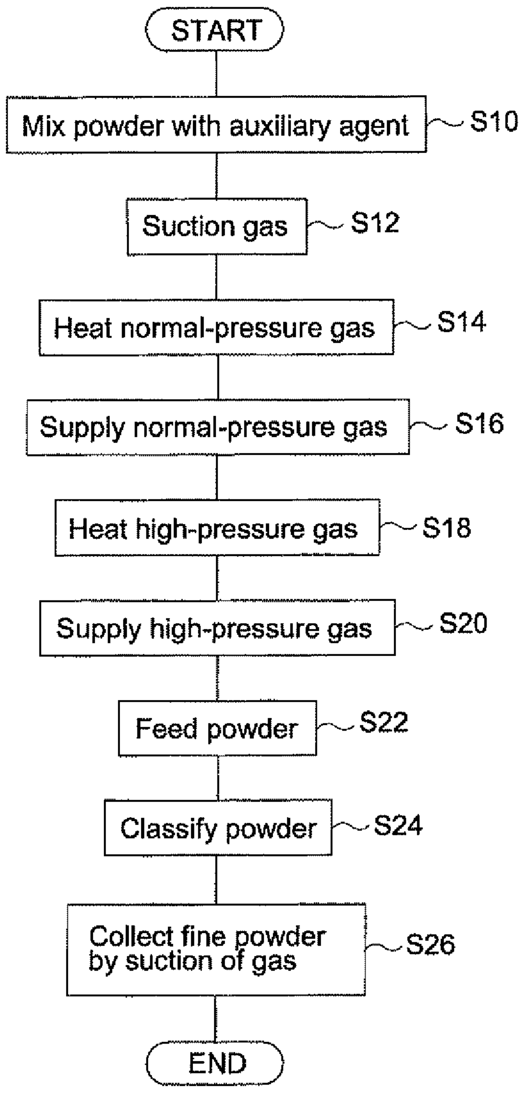
FIG. 4 A flowchart explaining a method for classifying powder according to the first embodiment.

Next, the method for classifying powder according to the present embodiment is explained by using the flowchart of FIG. 4. First of all, the powder to be classified and the alcohol used as the auxiliary agent are mixed together (step S10). Here, the type of the alcohol to be used can be selected appropriately in accordance with the type of the powder to be classified; however, as in the case of the method for classifying powder according to the present embodiment, if the powder to be classified is powdered barium titanate, it is desirable to use ethanol (C2H5OH) as the auxiliary agent. Further, the additive amount of the auxiliary agent and the mixing method can also be selected appropriately in accordance with the type of the powder; however, in the method for classifying powder according to the present embodiment, mixing is performed by using a mixer after adding 10% ethanol in terms of mass ratio with respect to the powder to be classified. It is noted that in the present embodiment, because some of the ethanol added to the powder evaporates during mixing with the powder and after mixing, the additive amount of ethanol at the time of feeding the mixed powder to the feeder 6 of the classification apparatus 2 is around 7% in terms of mass ratio; however, this ratio is not limited thereto.

Further, a Hi-X Mixer (manufactured by Nissin Engineering Inc.) is used as the mixer.

When the operation of the classification apparatus 2 is started, the suction of gas by the suction blower 12 starts (step S12). Because the gas inside the centrifuge chamber 20 is suctioned from the inlet 32 provided at the center of the upper surface of the centrifuge chamber 20, the air pressure at the center of the centrifuge chamber 20 becomes relatively low. In this way, due to the negative pressure generated inside the centrifuge chamber 20, the atmospheric air, which is the normal-pressure gas, is suctioned from in between respective guide vanes arranged along the outer circumference of the centrifuge chamber 20, and is supplied inside the centrifuge chamber 20 (step S16). It is noted that, by passing through the pipe provided inside the second heater 14, the normal-pressure gas that is suctioned inside the centrifuge chamber 20 is heated beforehand to the predetermined temperature (step S14). Thus, when the normal-pressure gas is suctioned from in between the guide vanes 40, a spinning air current having a flow speed determined in accordance with the swing angle of the guide vanes 40 is formed. In the method for classifying powder according to the present embodiment, the normal-pressure gas that is suctioned is heated up to a minimum of 150° C. such that the temperature of the spinning air current inside the centrifuge chamber 20 becomes around 140° C.

Next, the supply of high-pressure gas inside the centrifuge chamber 20 of the classifier 4 is started by using the blower 8. The high-pressure gas injected from the blower 8 is heated up to the predetermined temperature by the first heater 10 (step S18). It is noted that, similarly to the second heater 14, the first heater 10 heats the high-pressure gas up to a minimum of 150° C. such that the temperature of the spinning air current inside the centrifuge chamber 20 becomes around 140° C. The high-pressure gas heated up to the predetermined temperature is ejected out from the plurality of exhaust nozzles 30 provided on the external wall of the centrifuge chamber 20, and is supplied to the centrifuge chamber 20 (step S20).

Thus, when the state is formed wherein the high-speed spinning air current that is heated up to around 140° C. spins steadily inside the centrifuge chamber 20, the mixed powder delivered quantitatively from the feeder 6 is fed into the centrifuge chamber 20 from the input port 26 (step S22). As shown in FIG. 2, because the input port 26 is provided on the upper side of the outer circumference of the centrifuge chamber 20, the mixed powder fed from the input port 26 collides with the spinning air current that spins at a high speed in the outer circumference of the centrifuge chamber 20 and is dispersed rapidly. At this point, the ethanol (boiling point 78° C.) mixed in between the fine particles of the powder promotes dispersion of the powder by vaporizing at a rapid speed. Thus, the powder that is dispersed as fine particles spins several times inside the centrifuge chamber 20 without adhering on to the surface of the upper disc-like member 22, the lower disc-like member 24 and the like that configure the centrifuge chamber 20, and is classified based on the particle diameter of the powder (step S24).

As a result of the action of centrifugation in the centrifuge chamber 20, the fine powder having a particle diameter below the desired classification point accumulates in the center of the centrifuge chamber 20, and is collected from the inlet 32 along with the gas that is suctioned by the suction blower 12 due to the effect of the ring-shaped convex parts provided in the center of the upper disc-like member 22 and the lower disc-like member 24 respectively (step S26). It is noted that the rough powder having a particle diameter exceeding the classification point accumulates in the outer circumference of the centrifuge chamber 20 by the action of centrifugation in the centrifuge chamber 20, after which it moves down the conical-shaped part of the classifier 4 from the re-classification zone 28, and is stored in the recovering vessel 16 after being ejected from the exhaust 34.

Thus, the powder that is dispersed effectively due to the high-temperature spinning air current spins within the centrifuge chamber 20 and the effect of the auxiliary agent, which spins inside the centrifuge chamber 20 without adhering to the surface of the components configuring the centrifuge chamber 20, and is classified effectively into the fine powder below the desired classification point and the remaining rough powder. It is noted that because the entire amount of ethanol added as the auxiliary agent vaporizes, it is not present in the collected powder.

Further, in the present embodiment, the supplied gas is heated up to around 150° C. such that the temperature of the spinning air current inside the classifier 4 becomes around 140° C.; however, this is only an example, and even in cases where the supplied gas is heated such that the temperature of the spinning air current inside the classifier 4 becomes more than the boiling point of the auxiliary agent mixed with the powder and below 200° C., similar effects are exhibited, and effective classification can be performed.

Next, the effect of the method for classifying powder according to the present embodiment is explained by showing specific experiment results. In the present experiment, a classifier equipped with the thermal insulation feature is used, and the amount of gas suctioned by the suction blower 12 of FIG. 1 is assumed to be 0.6 m3/min., while the pressure of the high-pressure gas generated by the blower 8 is assumed to be 0.3 to 0.5 MPa. Further, in the present experiment, a powder composed only of finely powdered barium titanate, and a mixed powder formed by adding and mixing 10% ethanol, in terms of mass ratio, as an auxiliary agent to the finely powdered barium titanate are used as the powder to be classified. It is noted that the amount of the powder fed into the classifier is set to 300 g/hour. Further, the temperature inside the classifier is set to two modes, namely 60° C. and 140° C. It is noted that the temperature inside the classifier is determined by measuring the temperature of the gas immediately after it is suctioned from the inlet in the classifier by the suction blower of the classification apparatus.

Table 1 shows three experiment results, namely (1) The results of centrifugation of only finely powdered barium titanate by a classifier with an internal temperature of 140° C., (2) The results of centrifugation of a mixed powder of finely powdered barium titanate and ethanol by a classifier with an internal temperature of 60° C., and (3) The results of centrifugation of a mixed powder of finely powdered barium titanate and ethanol by a classifier with an internal temperature of 140° C.

TABLE 1

| Sample | Temperature in classifier | Supply amount | Adherence amount (Adherence rate) | Fine powder yield | Remarks |
|---|---|---|---|---|---|
| (1) Barium titanate | 140° C. | 42 g | 30 g (71%) | 5% | After 8 min., operation was stopped due to blocking |
| (2) Barium titanate + 10% ethanol | 60° C. | 61 g | 17 g (28%) | 46% | After 12 min., operation was stopped due to blocking |
| (3) Barium titanate + 10% ethanol | 140° C. | 173 g | 35 g (20%) | 54% | No blocking |

As shown in Table 1, when centrifugation was performed for only finely powdered barium titanate at a classifier temperature of 140° C., the finely powdered barium titanate adhered to the external wall, input port and the like inside the centrifuge chamber causing blockage eight minutes after the start of centrifugation. As a result, the amount supplied from the feeder (supply amount) remained at 42 g and at the same time, 71% of the supply amount, that is 30 g, adhered inside the centrifuge chamber, and therefore, only 5% of the input amount could be recovered as fine powder.

Further, when centrifugation was performed for a mixed powder of finely powdered barium titanate and ethanol at a classifier temperature of 60° C., blockage occurred 12 minutes after the start of centrifugation due to the same reason. As a result, the supply amount remained at 61 g and at the same time, 28% of the supply amount, that is 17 g, adhered inside the centrifuge chamber, and therefore, 46% of the input amount could be recovered as fine powder.

Finally, when centrifugation was performed for a mixed powder of finely powdered barium titanate and ethanol at a classifier temperature of 140° C., blockage did not occur. Of the 173 g supplied up to the end of the experiment, only 20% adhered inside the centrifuge chamber, and 54% of the supply amount could be recovered as fine powder.

It is noted that in each of the experiment results, the particle size distribution of the collected fine powder was the same, and the addition of ethanol as an auxiliary agent did not have any effect on the classification performance as such.

Based on the above results, the adsorption of finely powdered barium titanate can be dramatically prevented when finely powdered barium titanate and ethanol are mixed together. Thus, it is made clear that when the temperature in the classifier is increased sufficiently, it not only leads to an increase in the collect rate of fine powder, but further improves the classification efficiency due to the fact that the classifier does not stop as a result of blockages caused by the adsorption of the powder.

As described above, because the method for classifying powder according to the present embodiment enables feeding of the powder to be classified into the centrifuge chamber inside the fluid classifier after mixing it with an ethanol, which is an auxiliary agent, and at the same time enables the formation of a high-speed spinning air current having a high temperature inside the centrifuge chamber due to the heated gas, effective classification can be performed without causing the powder to adhere inside the fluid classifier even when classifying a powder with a particle diameter of less than 1 μm.

It is noted that in the above embodiment, the explanation is based on the use of barium titanate as the powder to be classified; however, nickel can also be used as the powder to be classified. In such a case, in step S14, the suctioned normal-pressure gas is heated by the second heater 14 such that the temperature of the spinning air current inside the centrifuge separator 20 becomes around 110° C., and similarly in step S18, the high-pressure gas is heated by the first heater 10 such that the temperature of the spinning air current becomes around 110° C.

Then in step S22, the mixed powder is fed into the centrifuge chamber 20; however, in cases where ethanol (boiling point 78° C.), which is one type of alcohol, is used as the auxiliary agent, this auxiliary agent vaporizes rapidly and dispersion of the powder is promoted because the temperature of the spinning air current is around 110° C.

Next, the method for classifying powder according to the second embodiment of the present invention is explained with reference to drawings. It is noted that the configuration of the method for classifying powder according to the second embodiment is characterized by the addition of the drying process to the method for classifying powder according to the first embodiment. Therefore, the detailed description of the configuration that is the same as the configuration of the above-mentioned classification apparatus 2 has been omitted, and only sections with variations are explained in detail. Further, the same symbols are used in the explanation of the configuration that is the same as the configuration of the above-mentioned classification apparatus 2.

Figure 5:
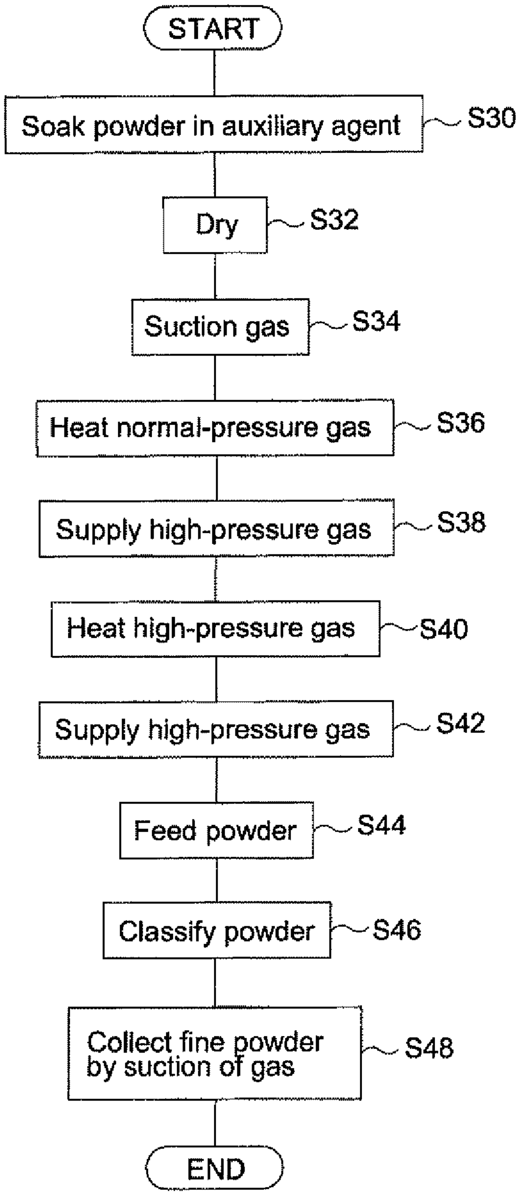
FIG. 5 A flowchart explaining the method for classifying powder according to a second embodiment.

FIG. 5 is a flowchart explaining the method for classifying powder according to the second embodiment. First of all, the powder to be classified is soaked in the auxiliary agent (step S30). For example, the nickel powder is soaked sufficiently in ethanol as the auxiliary agent. Then, after the lapse of the predetermined time, such as a few hours, the auxiliary agent is evaporated by drying the powder soaked in the auxiliary agent (step S32). Next, the processing shown in steps S34 to S48 is executed, but because this processing is the same as the processing shown in steps S12 to S26 of the flowchart in FIG. 4 respectively, its explanation has been omitted.

As regards the temperature settings of the spinning air current inside the centrifuge separator 20, for example, in step S36, the suctioned normal-pressure gas is heated by the second heater 14 such that the temperature of the spinning air current becomes around 110° C., and similarly in step S40, the high-pressure gas is heated by the first heater 10 such that the temperature of the spinning air current becomes around 110° C.

EXAMPLES

Next, the method for classifying powder according to the present embodiment is explained more specifically by using examples. It is noted that the some part of the additive amount of auxiliary agent at the time of mixing the nickel powder and the auxiliary agent vaporizes and is thus reduced during mixing with the powder and after mixing. Therefore, in the following example, at the time of feeding the mixed powder into the feeder 6 of the classification apparatus 2, the amount of the auxiliary agent included in the mixed powder is expressed as the amount of adsorption of the auxiliary agent.

Example 1

In example 1, a classifier equipped with the thermal insulation feature was used, and the amount of gas suctioned by the suction blower was assumed to be 1.0 m3/min., while the pressure of the high-pressure gas generated by the blower was assumed to be 0.8 MPa. Further, in the present experiment, nickel powder composed of finely powdered particles with a median diameter of 0.4 μm was used as the powder to be classified, ethanol was mixed in with the finely powdered nickel as an auxiliary agent, and a mixed powder with the amount of adsorption of ethanol being 0.25 to 3.7% in terms of mass ratio was obtained. It is noted that the amount of the powder fed into the classifier was set to 200 g/hour and the temperature inside the classifier was set to 110° C. Table 2 describes the relationship between the amount of adsorption (mass ratio) of ethanol in the mixed powder and the yield of fine powder.

TABLE 2

| Ethanol adsorption amount (mass ratio) | Fine powder yield |
|---|---|
| 0% | 30.8% |
| 0.25% | 34.2% |
| 2.5% | 68.5% |
| 3.7% | 63.1% |

As shown in Table 2, when classification of nickel powder that had adsorbed ethanol as the auxiliary agent was performed, the yield of fine powder was higher as compared to the case wherein an auxiliary agent was not added (ethanol adsorption amount 0%). Particularly, in the case where 2.5% of ethanol was adsorbed as the auxiliary agent, finely powdered nickel could be recovered with a high yield of the fine powder.

Therefore, the yield of finely powdered nickel can be improved through the adsorption of ethanol as the auxiliary agent.

Example 2

In example 2, a classifier equipped with the thermal insulation feature was used, and the amount of gas suctioned by the suction blower was assumed to be 1.0 m3/min., while the pressure of the high-pressure gas generated by the blower was assumed to be 0.8 MPa. Further, in the present experiment, nickel powder composed of finely powdered particles with a median diameter of 0.7 μm that is to be classified was soaked in ethanol, which is the auxiliary agent. Then, after the lapse of a few hours, ethanol was evaporated and dried, and nickel powder with the amount of adsorption of ethanol being 0.09 to 0.7% in terms of mass ratio was obtained. It is noted that the amount of the powder fed into the classifier was set to 200 g/hour and the temperature inside the classifier was set to 110° C. Table 3 describes the relationship between the amount of adsorption (mass ratio) of ethanol in the mixed powder after drying and the yield of fine powder.

TABLE 3

| Ethanol adsorption amount (mass ratio) | Fine powder yield |
|---|---|
| 0% | 7.8% |
| 0.09% | 14.9% |
| 0.7% | 17.1% |

As shown in Table 3, when classification of nickel powder was performed after it was soaked in ethanol as the auxiliary agent and was then dried, the yield of fine powder was higher as compared to the case wherein an auxiliary agent was not added (additive amount of ethanol 0%).

Therefore, the yield of finely powdered nickel can be improved after soaking it in ethanol as the auxiliary agent and then drying it.

It is made clear from the results of example 1 and example 2 that when ethanol is mixed as an auxiliary agent to finely powdered nickel, the yield of fine powder improves and the efficiency of classification also improves.

It is noted that in each of the above examples 1 and 2, centrifugation was continued for 30 minutes, but there was no stoppage of operation due to blockage. Also, in each of the experiment results, the particle size distribution of the recovered fine powder was the same, and the addition of the auxiliary agent did not have any effect on the classification performance as such.

REFERENCE SIGNS LIST

2 classification apparatus
4 Classifier
6 Feeder
8 Blower
10 First heater
12 Suction blower
14 Second heater
20 Centrifuge chamber
22 Upper disc-like member
24 Lower disc-like member
26 Input port
30 Exhaust nozzle
32 Inlet
40 Guide vane

The invention claimed is:

1. A method for classifying powder using a fluid classifier, the method comprising:
- a mixing step of mixing a powder with an auxiliary agent made of an alcohol;
- a feeding step of feeding the powder mixed at the mixing step into the fluid classifier;
- a heating step of heating a gas;
- a supplying step of supplying the gas heated at the heating step to the fluid classifier; and
- a classifying step of classifying the powder dispersed as fine particles in the fluid classifier based on particle diameter, wherein: (i) the powder is dispersed as fine particles as a result of vaporization of the auxiliary agent which is mixed with the powder in the fluid classifier, (ii) the powder is classified by way of a spinning air current generated in the fluid classifier, and (iii) the fluid classifier is configured to alter a temperature and speed of the spinning air current.

2. The method for classifying powder according to claim 1, wherein at the heating step, the gas is heated so that a temperature in the fluid classifier is the boiling point or higher of the alcohol and 200° C. or less.

3. The method for classifying powder according to claim 1, wherein the gas supplied at the supplying step is a normal-pressure gas.

4. The method for classifying powder according to claim 1, wherein the gas supplied at the supplying step is a high-pressure gas.

5. The method for classifying powder according to claim 1, wherein the alcohol is ethanol.

6. The method for classifying powder according to claim 1, wherein the powder is powdered barium titanate.

7. The method for classifying powder according to claim 1, wherein the powder is powdered nickel.

8. The method for classifying powder according to claim 1, comprising a drying step of drying the powder mixed at the mixing step, wherein at the feeding step, the powder fed into the fluid classifier is dried powder at the drying step.

* * * * *